G. C. BEIDLER.
AUTOGRAPHIC CAMERA.
APPLICATION FILED AUG. 15, 1917.
1,377,455.
Patented May 10, 1921.
2 SHEETS—SHEET 2.
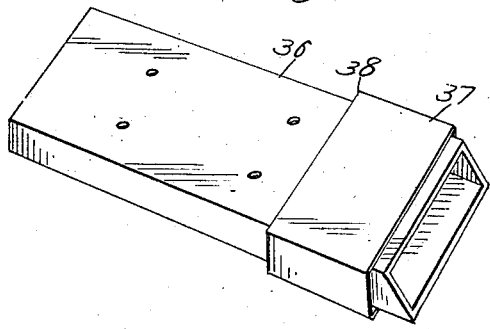
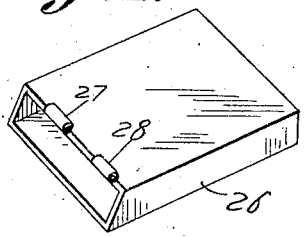
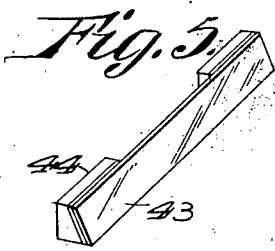
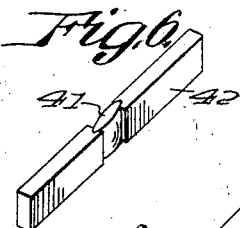
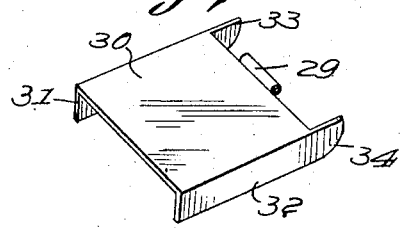
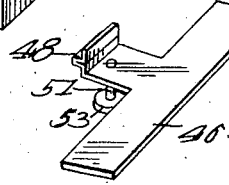
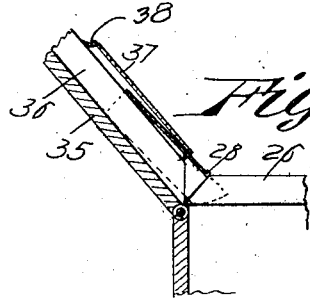
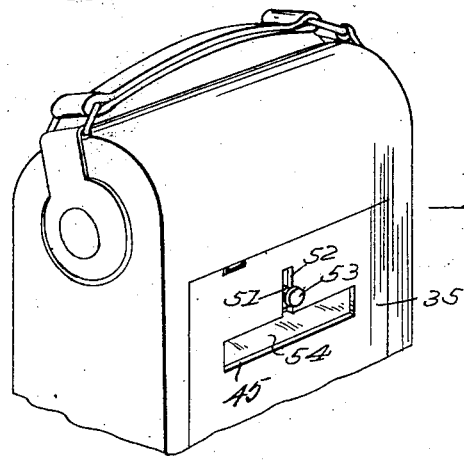
Inventor
George C. Beidler,
By Frank S. Ackerman,
Attorney

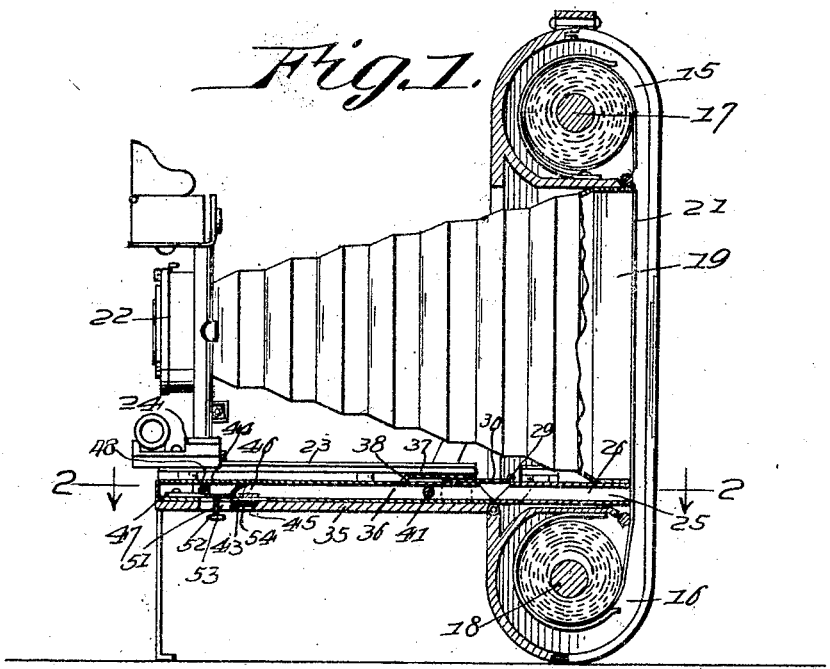
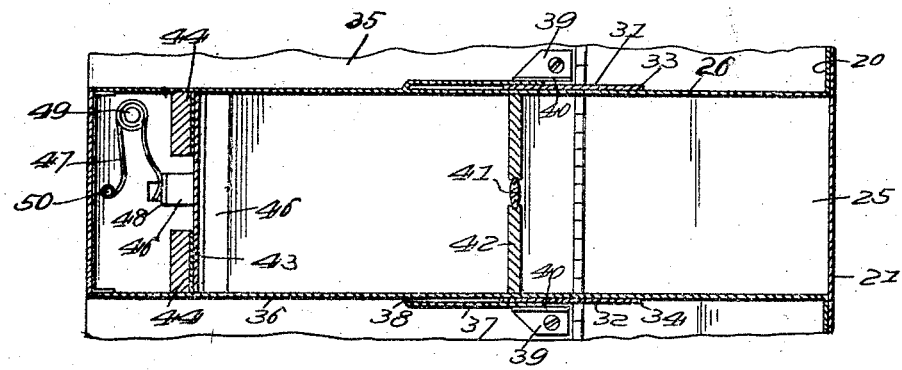

UNITED STATES PATENT OFFICE.

GEORGE C. BEIDLER, OF ROCHESTER, NEW YORK.

AUTOGRAPHIC CAMERA.

1,377,455. Specification of Letters Patent. Patented May 10, 1921.

Application filed August 15, 1917. Serial No. 186,390.

*To all whom it may concern:*

Be it known that I, GEORGE C. BEIDLER, a citizen of the United States of America, and resident of Rochester, in the county of Monroe and State of New York, have invented certain new and useful Improvements in Autographic Cameras, of which the following is a specification.

This invention relates to photography and particularly to autographic cameras.

An object of this invention is to provide novel means whereby inscriptions or other indicia may be photographed or otherwise reproduced on a sensitized element such as a film by the projection or transmission of light, novel means being provided also whereby a so-called folding camera may be supplied with means whereby light may be admitted to the sensitized element independently of that which is admitted through the lenses of cameras now in ordinary use.

A further object of this invention is to provide novel means whereby a folding camera may be provided with novel means for protecting or guarding the sensitized element from light at the joint or hinge between the camera casing and the folding section or door.

In carrying out the present invention, it is the purpose to provide means whereby cameras now ordinarily manufactured and known as roll film cameras may, without undue alteration or change, be supplied with autographic means; hence provision is made for supplying means detachably to the door or shelf of ordinary roll film cameras and to the casing thereof whereby writing or other marks on a translucent material may be projected to the surface of the sensitized material so as to affect the sensitized coating and cause the reproduction of the writing or marks on the film when the same is developed in the ordinary way.

With the foregoing and other objects in view, the invention consists in the broad idea as well as in the details of construction to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification, wherein like characters denote corresponding parts in the several views, and in which—

Figure 1 illustrates a sectional view, partly in elevation, of a camera embodying the invention;

Fig. 2 illustrates a horizontal sectional view on a line corresponding with the line 2—2 of Fig. 1;

Fig. 3 illustrates a view in perspective of the front end of the exposure tube;

Fig. 4 illustrates a view in perspective of the rear section thereof;

Fig. 5 illustrates a perspective view of a mirror;

Fig. 6 illustates a perspective view of the lens and lens holder;

Fig. 7 illustrates a perspective view of the light shield;

Fig. 8 illustrates a perspective view of a joint closing plate;

Fig. 9 illustrates a perspective view of a shutter;

Fig. 10 illustrates a view in elevation of fragments of the front and rear exposures tube and the joint therebetween; and Fig. 11 illustrates a perspective view of a fragment of the camera casing with the door in closed position.

In the illustration, a camera of ordinary type is shown comprising the film roll chambers 15 and 16 respectively adapted to contain spools 17 and 18 which are rotatably mounted as in cameras of the roll film type.

An exposing chamber 19 has the usual bellows leading from it and between the bellows and the film roll chambers or one of them, there is in many constructions of camera a plate 20 which might be termed a part of the bellows frame; at least it constitutes in many instances the front wall of the exposing chamber, back of which the film 21 may travel. The lens 22, base plate 23 and the sliding member 24 which moves with relation to the base plate and which supports the lens and the front of the bellows are all or may be of ordinary construction and there is no need, it is thought, for a detailed description of these parts.

In the present embodiment of the invention, the plate 20 is provided with an aperture 25 and a light conduit or tubular member 26 has its rear end communicating with the said aperture so that light passing therethrough may strike the sensitized surface of the film. This light conduit or tubular member 26 is preferably stationary and may be secured to the camera casing in any appropriate way and preferably it communicates with the exposing chamber so that light admitted through it will be outside of the field of exposure of the ordinary or principal lens of the camera.

The outer end of the light conduit or tubular member 26 has ears 27 and 28 which are curved to form eyes to receive a pintle on which the eye 29 of the light shield 30 is hinged, the said light shield 30 comprising a straight portion with side flanges 31 and 32 and end extensions 33 and 34, the latter of which extends along the side of the tubular member 26 to insure a light-proof joint between the said section and the said shield.

The camera illustrated is of a type having a hinged door 35 which carries the base plate 23 but in the present embodiment of the invention, the door 35 is provided with an outer tubular section or light conduit 36 which is adapted to aline with the inner tubular section 26 when the door is in open position to constitute a shelf for the support of the distended bellows and the lens. This outer tubular member 36 is embraced by the light shield and the said light shield accommodates itself to the position of the outer tubular section as the said outer tubular section slides as the door swings. The inner end of the outer section has a sleeve 37 which stands away from the tubular section so as to constitute a clearance for the light shield, the said light shield being movable between the tubular member and the said sleeve, whereas there is a tight joint between the said sleeve and the tubular extension at the outer end 38 of said sleeve.

As a further protection and to prevent rays of light gaining access to the interior of the light conduit except in a manner to be presently explained, guards are positioned on each side of the light shield at its junction with the sleeve, the said guards constituting plates 39 secured to the door and provided with upwardly extending flanges 40 which lap the joint between the light shield and the sleeve.

Preferably within the outer tubular member, a lens 41 is held by a lens carrier 42 which may be held in place in any appropriate way. A mirror or reflector 43 is mounted on carriers 44 so as to reflect light admitted to the outer tubular member through the aperture 45, said aperture being guarded by a shutter 46 which is held normally closed to guard the aperture by the spring 47 which spring bears against a lug 48 of the shutter. The spring in the present embodiment of the invention encircles a stud 49 and has one end anchored as at 50 so that the spring operates to press the shutter normally inwardly. A shank 51 is connected to the shutter and it projects through a slot 52 of the cover and terminates in a button 53 which may be manipulated for pulling the shutter against the action of the spring for unguarding the opening and permitting light to gain access to the interior of the outer tubular section and where it is reflected to the lens through the inner tubular section to the sensitized element.

The aperture 45 is preferably covered by a plate or strip of translucent material 54, preferably ground glass on which writing or other marks may be produced by a lead pencil and therefore when the shutter is moved, the light is admitted and reflected in the manner indicated to photograph the writing or marks on the translucent material which will appear on the negative after it is developed in the usual way and when photographically printed, the picture and writing or indicia will appear on the picture.

It has been found that mechanism made in accordance with the foregoing invention may be utilized in connection with cameras now in common use or they may be installed in newly built cameras or those in process of manufacture without very materially increasing the cost and without changing the models or sizes of the said cameras.

Furthermore, cameras made in accordance with this invention do not require special appliances or apparatus other than that indicated for producing the writings or marks and they may be used in connection with films of ordinary types and the same satisfactory results may be attained as is now attained by specially prepared films.

I claim—

1. A camera adapted to produce a principal image upon a sensitized member therein, a passage having light-tight walls and opening at one end adjacent to the front of the sensitized member in the camera, the other end being adapted for the reception of light to be conducted to said member, the said walls having a hinged joint between their ends whereby one section of the light-tight walls is hinged with relation to the other section of said walls, means for guarding the said joint to exclude light, means for producing in the passage a supplemental image on such sensitized member, an exposure-timing shutter to independently control the light passing through said supplemental image-producing means alone, and an inscription carrier so supported that the image of the inscription thereon will be projected on the sensitized member in the camera by said supplemental image-producing means.

2. A camera adapted to produce a principal image upon a sensitized member therein, a passage having light-tight walls and opening at one end adjacent to the front of the sensitized member in the camera, the other end being adapted for the reception of light to be conducted to said member, said passage having means for producing therein a supplemental image on such sensitized member, the said walls having a hinged joint between their ends whereby one section of the light-tight walls is hinged with relation to the other section of said walls, means for guarding the said joint to exclude light, an exposure-timing shutter to independently control the light passing through the supplemental image-producing means alone, and a translucent inscription carrier supported by the camera for the transmission therethrough of light to the last named means so that the image of the inscription on the carrier will be produced by said supplemental means upon the sensitized member in the camera.

3. A camera adapted to produce a principal image upon a sensitized member therein, a passage having light-tight walls and opening at one end adjacent to the front of the sensitized member in the camera, the other end being adapted for the reception of light to be conducted to said member, the said walls having a hinged joint between their ends whereby one section of the light-tight walls is hinged with relation to the other section of said walls, means for guarding the said joint to exclude light, means for producing in the passage a supplemental image on such sensitized member, an exposure-timing shutter to independently control the light passing through said last named image-producing means alone, and an inscription receiver having a surface upon which an inscription may be produced and from which it may be readily erased, the receiver being so supported by the camera that the image of the inscription thereon will be projected on the sensitized member in the camera by said supplemental image-producing means.

4. A camera adapted to produce a principal upon a sensitized surface, a passage opening into the interior of the camera and having light-tight walls, the said walls having a hinged joint between their ends whereby one section of the light-tight walls is hinged with relation to the other section of said walls, means for guarding the said joint to exclude light, means for producing in the passage a supplemental image on the same sensitized surface, a movable exposure-timing element arranged to independently control light passing through the supplemental image-producing means alone, and a translucent inscription carrier supported in proper position for the inscription thereon to be projected by the supplemental image-producing means, said passage extending to said inscription carrier and the light entering the passage passing through said carrier.

5. In an autographic camera, a sectional light conduit for the camera, delivering light to a sensitized element therein other than the light projected by the lens of the camera, one section of the conduit being hinged with relation to the other section thereof, means for preventing the entrance of actinic light to the said conduit at the joints of the section, the said conduit having an opening therein, a shutter for guarding the opening, a translucent material adapted to receive writing, the said translucent material being inserted in the said opening, and means for projecting the image of such writing onto the sensitized element.

6. In an autographic camera, a sectional light conduit for a camera for delivering light to a sensitized element therein derived from a source other than the lens of the camera, means for hingedly connecting the sections of the conduit, means to prevent entrance of light to the conduit at the said joint, a translucent material adapted to receive writing, the said light conduit having an opening in which the translucent material is located, a shutter for guarding the opening, means for projecting an image of such writing onto the sensitized element, and a mirror for reflecting light and the image from the translucent material to the projecting means.

7. In an autographic camera having a hinged closure, a light conduit carried by the closure, a light conduit on the camera with which the first mentioned light conduit communicates, means for guarding the conduits from actinic light at the point of communication between the conduits, a lens in the conduit, said conduit having an opening therein forward of the lens, a shutter for guarding the opening, a translucent covering for the said opening adapted to receive writing whereby writing on said translucent material is projected to the sensitized element.

In testimony whereof I hereunto affix my signature, this 13th day of August, 1917.

GEORGE C. BEIDLER.